(12) United States Patent
DeFelice

(10) Patent No.: US 9,377,080 B2
(45) Date of Patent: Jun. 28, 2016

(54) METHOD FOR TERMINATING A ROPE

(71) Applicant: Matthew DeFelice, Jackson, NJ (US)

(72) Inventor: Matthew DeFelice, Jackson, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 93 days.

(21) Appl. No.: 14/528,565

(22) Filed: Oct. 30, 2014

(65) Prior Publication Data
US 2016/0123429 A1    May 5, 2016

(51) Int. Cl.
*F16G 11/02* (2006.01)
*F16G 11/05* (2006.01)
*F16G 11/04* (2006.01)
*F16G 11/12* (2006.01)

(52) U.S. Cl.
CPC .............. *F16G 11/05* (2013.01); *F16G 11/02* (2013.01); *F16G 11/025* (2013.01); *F16G 11/04* (2013.01); *F16G 11/044* (2013.01); *F16G 11/046* (2013.01); *F16G 11/12* (2013.01); *Y10T 29/4989* (2015.01); *Y10T 29/49913* (2015.01)

(58) Field of Classification Search
CPC ..................... Y10T 29/4989; Y10T 29/49913; Y10T 29/49929; F16G 11/02; F16G 11/025; F16G 11/04; F16G 11/042; F16G 11/046; F16G 11/044; F16G 11/12
See application file for complete search history.

(56) References Cited

U.S. PATENT DOCUMENTS

| | | | | |
|---|---|---|---|---|
| 1,443,895 A * | 1/1923 | Harris | ..................... | F16G 11/00 24/135 A |
| 2,155,536 A * | 4/1939 | Fauria | ..................... | F16G 11/00 403/209 |
| 3,264,017 A * | 8/1966 | Howe | ..................... | F16G 11/04 174/177 |
| 3,786,554 A * | 1/1974 | Little | ..................... | F16G 11/04 29/461 |
| 3,858,992 A * | 1/1975 | Eucker | ..................... | F16G 11/04 174/79 |
| 4,043,690 A * | 8/1977 | Browne | ..................... | B66B 7/08 29/460 |
| 4,507,008 A * | 3/1985 | Adl | ..................... | F16G 11/04 174/89 |
| 5,022,780 A * | 6/1991 | Shaw | ..................... | F16G 11/04 24/122.3 |
| 5,136,755 A * | 8/1992 | Shaw | ..................... | F16G 11/05 24/122.6 |
| 2008/0282511 A1 * | 11/2008 | Chou | ..................... | F16G 11/00 24/135 R |

FOREIGN PATENT DOCUMENTS

| | | | | |
|---|---|---|---|---|
| FR | 2410186 A1 * | 6/1979 | ............. | F16G 11/04 |
| JP | WO 9928650 A1 * | 6/1999 | ............. | F16G 11/00 |

* cited by examiner

*Primary Examiner* — Jermie Cozart
(74) *Attorney, Agent, or Firm* — Mark O. Glut; NAWCAD

(57) ABSTRACT

A method for terminating a rope sliding a socket over the rope which includes unlaying the outer strands of the rope, sliding a wedge onto the core such that the outer strands surround the wedge, the wedge includes a central bore axially aligned with the socket, further sliding the wedge such that the core enters the central bore and is terminated by the wedge, pressing the outer strands of the rope against the wedge, sliding the socket over the wedge such that the outer strands are captured between the wedge and the socket, and swaging the socket such that the outer strands are secured.

4 Claims, 6 Drawing Sheets

METHOD FOR TERMINATING A ROPE

STATEMENT OF GOVERNMENT INTEREST

The invention described herein may be manufactured and used by or for the Government of the United States of America for governmental purposes without payment of any royalties thereon or therefor.

BACKGROUND

Currently the arresting gear system on aircraft carriers rely on a purchase cable to transfer energy from the landing aircraft to arresting gear engines located below the deck. Each end of the purchase cable is fitted with a terminal. The purchase cable terminal on the top-deck-end connects to a cross deck pendant which is engaged by the landing aircraft's tail hook. On the opposite end of the purchase cable, the terminal connects the purchase cable to anchors after the cable has been reeved through to the arresting engine.

The purchase cable terminal is a critical safety item. The failure of a terminal during aircraft arrestment could result in the loss of life, loss of an aircraft, and/or property damage. When a purchase cable is replaced, a new terminal needs to be attached to new cable in order to connect the purchase cable with the cross deck pendant. Currently, this requires the user to pour molten zinc into the socket terminal, which is a toxic, hazardous, and time consuming process.

The United States Navy has been investigating to utilize a hybrid rope construction with an outer lay of metallic strands and a synthetic fiber load carrying core. Therefore, a quick easy method to terminate a rope is required to meet the demands of in-service Navy use.

SUMMARY

The present invention is directed to a method for terminating a rope with the needs enumerated above and below.

The present invention is directed to a method for terminating a rope with a core, the method comprising of sliding a socket over the rope, unlaying the outer strands of the rope, sliding a wedge with a central bore onto the core such that the outer strands surround the wedge, further sliding the wedge such that the core enters the central bore and is terminated by the wedge, pressing the outer strands of the rope against the wedge, sliding the socket over the wedge such that the outer strands are captured between the wedge and the socket, and swaging the socket such that the outer strands are secured.

It is a feature of the present invention to provide a method for terminating a rope that is quick, not toxic, and easy.

It is a feature of the present invention to provide a method for terminating a rope that withstands aircraft arresting loads.

DRAWINGS

These and other features, aspects and advantages of the present invention will become better understood with reference to the following description and appended claims, and accompanying drawings wherein:

DESCRIPTION

Figure 5:
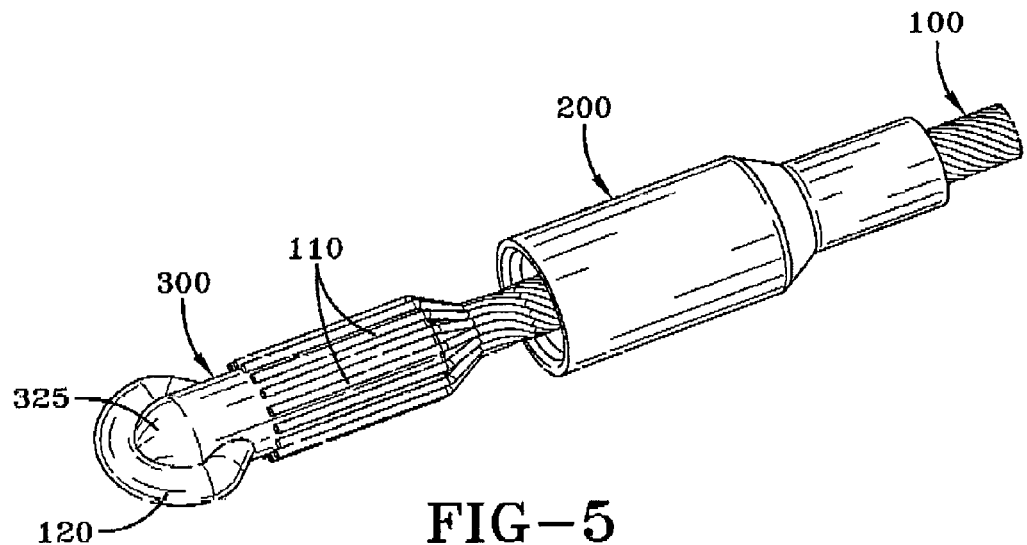
FIG. 5 is a perspective view of the outer stands pressed against the wedge.
Figure 6:
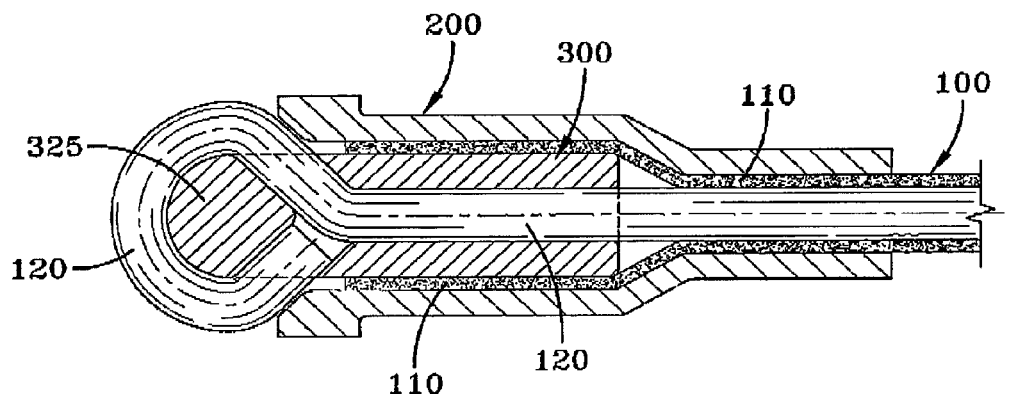
FIG. 6 is a cross-sectional view of the outer strands captured between the wedge and socket.

The preferred embodiments of the present invention are illustrated by way of example below and in FIGS. 1-8. The rope 100 utilized in the method for terminating a rope, shown in FIG. 4, has outer strands 110 surrounding a core 120. The method includes sliding a socket 200 over the rope 100, unlaying the outer strands 110 of the rope 100, sliding a wedge 300 (shown in FIG. 3) onto the core 120 such that the outer strands 110 surround the wedge 300. The wedge 300 includes a central bore 310 axially aligned with the socket 200. When sliding the wedge 300 onto the core 120, the core 120 enters the central bore 310 and is terminated by the wedge 300. After sliding the wedge 300 onto the core 120, the method further includes pressing the outer strands 110 of the rope against the wedge 300 (as shown in FIG. 5), sliding the socket 200 over the wedge 300 such that the outer strands 110 are captured between the wedge 300 and the socket 200 (as shown in FIG. 6), and swaging the socket 200 such that the outer strands 110 are secured.

In the description of the present invention, the invention will be discussed in an aircraft and ship environment; however, this invention can be utilized for any type of application that requires use of a method for terminating a rope.

Figure 1:
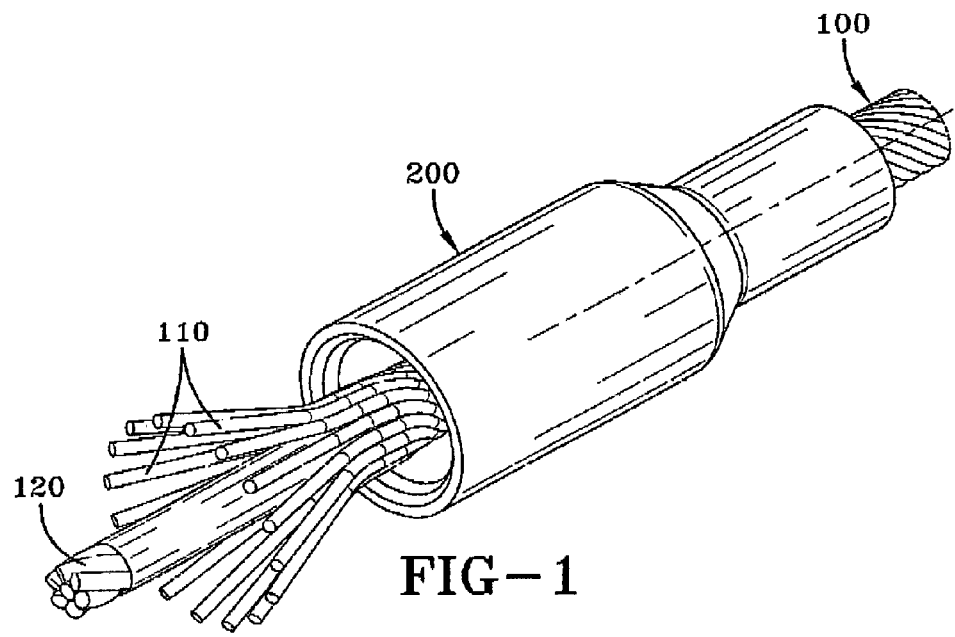
FIG. 1 is a perspective view showing the steps of unlaying the strands and sliding a socket over the rope.
Figure 4:
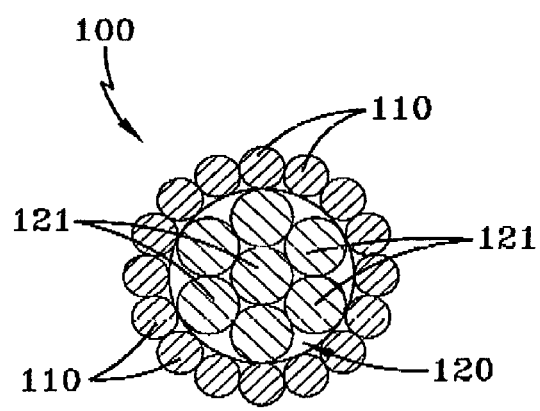
FIG. 4 is a cross sectional view of an embodiment of the rope.

As shown in FIGS. 1 and 4, the rope 100 utilized in the method for terminating a rope has a high strength, light weight fiber inner core 120, and an outer layer or lay of metallic wire strands 110. In the preferred embodiment, the core 120 is manufactured from synthetic load bearing material. However, any type material that is wear and abrasion resistant can be used for the outer layer or lay. As shown in FIG. 4, the core 120 may have larger inner synthetic strands 121, while the outer strands 110 are smaller outer metallic strands.

Figure 3:
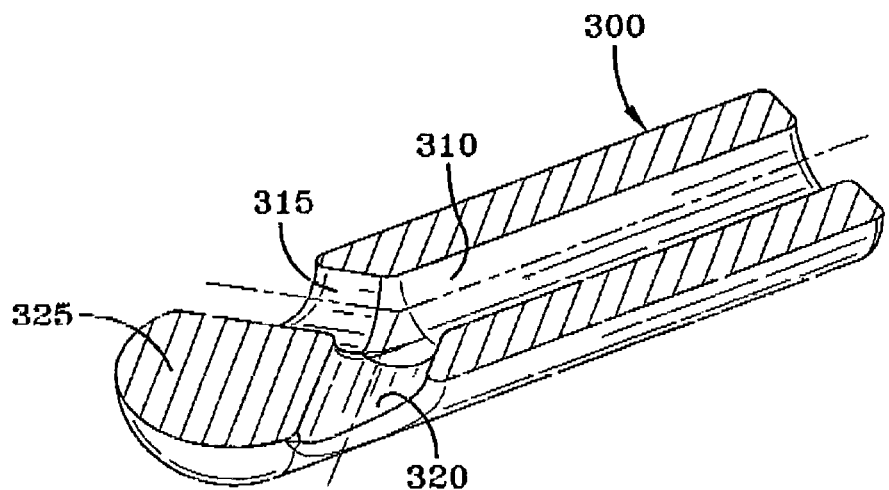
FIG. 3 is a perspective cross sectional view of an embodiment of the wedge.

A socket 200 may be defined, but without limitation, as a hollow object into which something fits. In the preferred embodiment, the socket 200 may have grooves machined in its inner diameter to accept the outer strands 110. The grooves may be machined to match the lay angle, thereby providing a smooth load transition into the terminal. A wedge 300 may be defined, but without limitation, as an object which captures and separates layers of a rope. As shown in FIG. 3, in the preferred embodiment, the wedge 300 includes the central bore 310 which transitions into a side bore 315 and an opposite side bore 320 that both lead out of the wedge 300. The wedge 300 may also have a rounded end 325. Alternatively, the wedge 300 may be a potted socket and/or may have grooves machined on its outer diameter to accept the outer strands 110.

Figure 2:
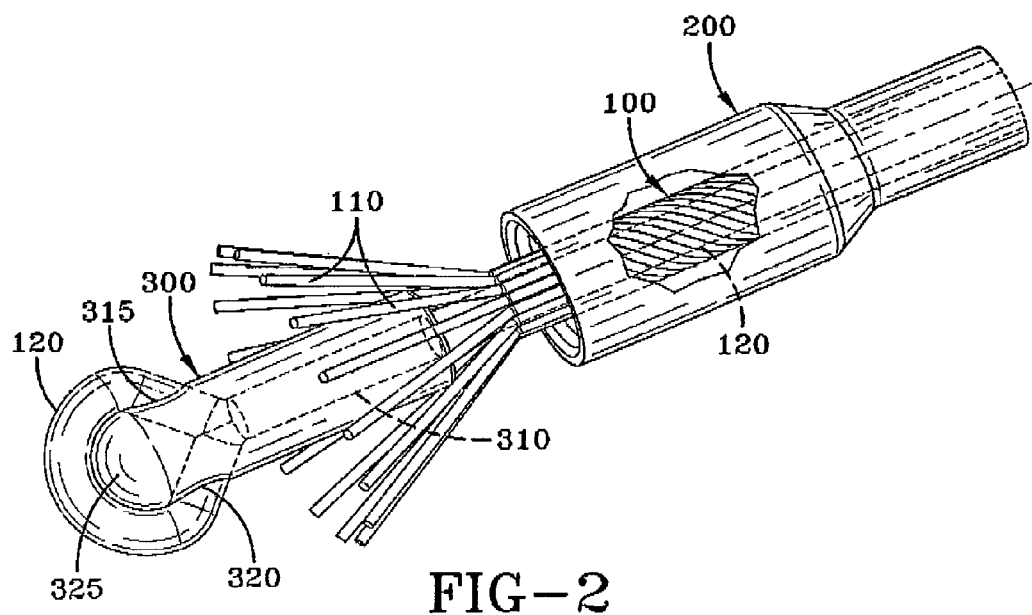
FIG. 2 is a perspective view of the core wrapped around the wedge.

As shown in FIG. 2, the method may additionally include the step of having the core 120 pass through the central bore 310, into and out of the side bore 315, then wrapping the core 120 around the rounded end 325 of the wedge 300, then having the core 120 enter the opposite side bore 320, such that the core 120 terminates in the opposite side bore 320. As shown in FIGS. 2 and 5, the core 120 of the rope 100 passes through the central bore 310 of the wedge 300, passes through the side bore 315, around the rounded end 325 of wedge 300, into the opposite side bore 320 and terminating therein. After the core 120 is wrapped around the wedge 300, the socket 200 is slid over the wedge 300 and outer strands 110, as shown in FIG. 6. Alternatively or additionally, as shown in FIGS. 9-12, the central bore 310 may transition into a voided area of conical shape (or conical void) 350, the core 120 then brooms outward to fill the conical void 350, and fining the conical void with a resin 360 (or zinc binder) such that the core 120 terminates in the wedge 300.

Figure 7:
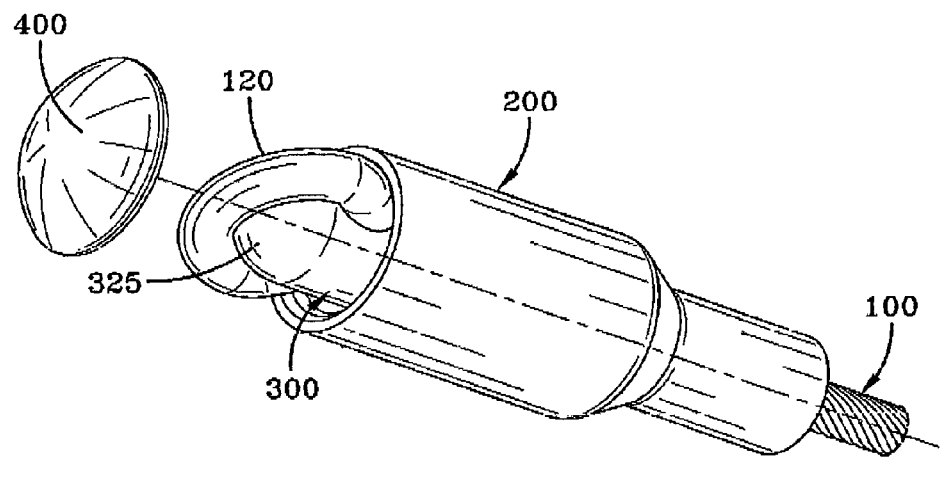
FIG. 7 is a perspective view of the crush plate on the edge of the wedge.
Figure 8:
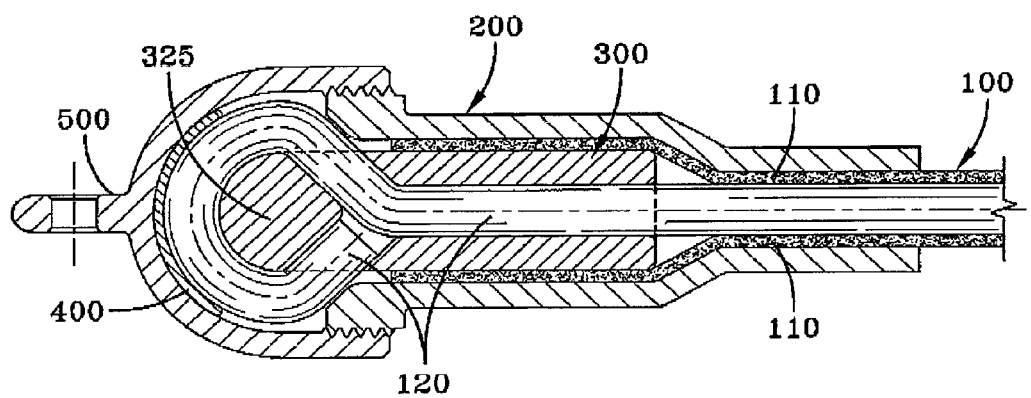
FIG. 8 is a cross sectional view of the completed product after the method is completed.
Figure 9:
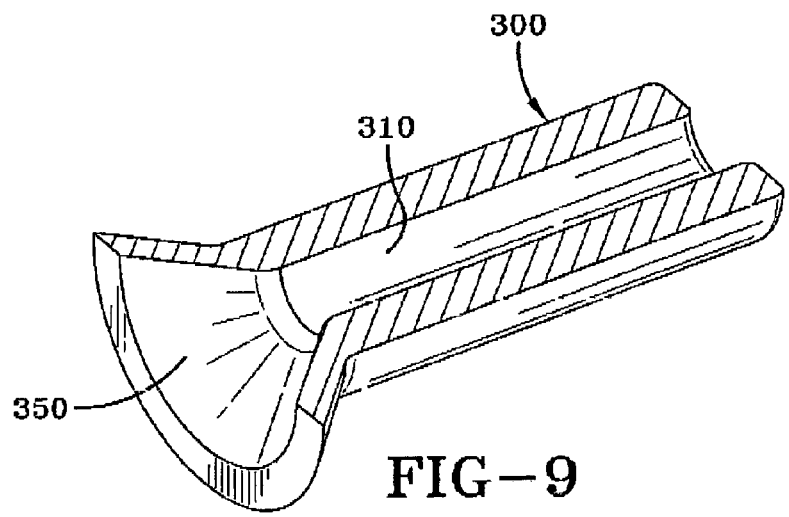
FIG. 9 is a perspective cross sectional view of another embodiment of the wedge.
Figure 10:
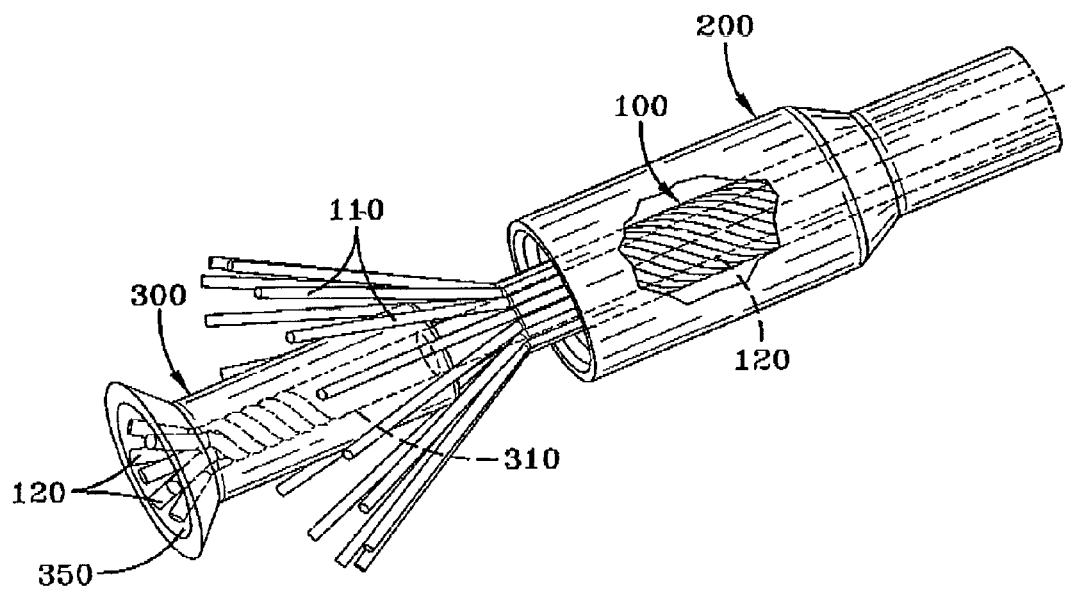
FIG. 10 is a perspective view of another embodiment of the invention with the core wrapped around the wedge.
Figure 11:
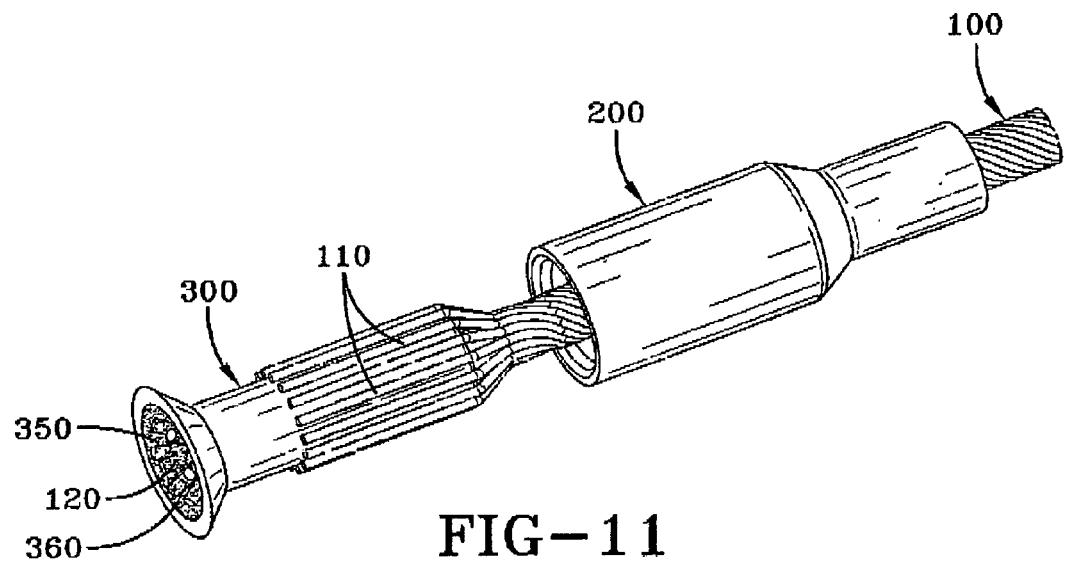
FIG. 11 is a perspective view of another embodiment with the outer stands pressed against the wedge; and, FIG. 12 is cross-sectional view of another embodiment with the outer strands captured between the wedge and socket.
Figure 12:
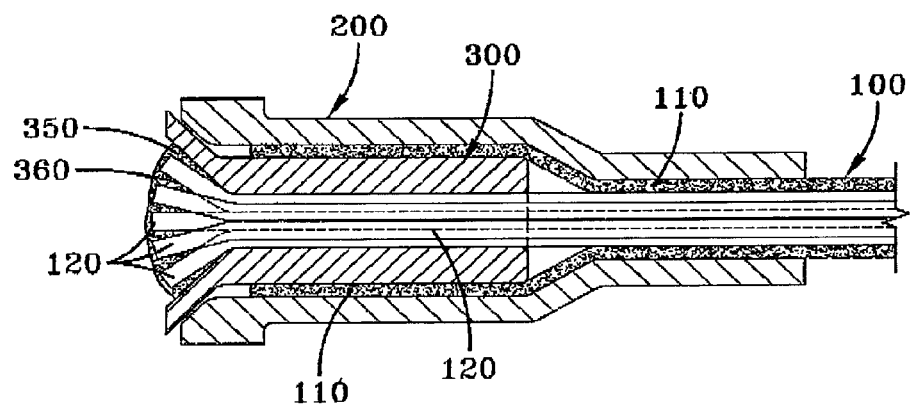

As shown in FIG. 7, the method for terminating a rope may also include placing a crush plate 400 on the edge of the wedge 300 where the core 120 is terminated (also defined as the rounded end 325 of the wedge 300). A crush plate 400 may be defined, but without limitation, as an object which translates compression force and prevents abrasion to mating components. As shown in FIG. 8, additionally or alternatively, a clevis 500 may be threaded onto the socket 200 and torqued to a value necessary to provide clamp force greater than the expected maximum load of the rope 100. A clevis 500 may be defined, but without limitation as a U-shaped or forked metal connector within which another part can be fastened by means of a bolt or pin passing through the ends of the connector. The clevis 500 may be locked into place using a pin, bolt, weld, threaded interface, or any other means practicable.

Swaging, may be defined, but without limitation, as a forging process wherein split dies are used to reduce the diameter of the socket 200 around the metallic wire strands 110 and the wedge 300 creating a permanent mechanical joint.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A method for terminating a rope, the rope having outer strands surrounding a core, the method comprising:
   sliding a socket over the rope;
   unlaying the outer strands of the rope;
   sliding a wedge onto the core such that the outer strands surround the wedge, the wedge includes a central bore axially aligned with the socket, further sliding the wedge such that the core enters the central bore and is terminated by the wedge;
   pressing the outer strands of the rope against the wedge, the outer stands;
   sliding the socket over the wedge such that the outer strands are captured between the wedge and the socket; and,
   swaging the socket such that the outer strands are secured; and
   placing a crush plate on a rounded end of the wedge, and installing a clevis onto the socket and over the crush plate and rounded end, and applying force to compress the crush plate and to securely affix the wedge in place.

2. The method for terminating a rope of claim 1, wherein the core enters the central bore of the wedge, the wedge further having the central bore transitioning into a side bore and an opposite side bore that both lead out of the wedge, and the method further comprising wrapping the core around an end of the wedge such that the core passes and exits through the side bore and terminates in the opposite side bore, and securing the core between the wedge and socket.

3. The method for terminating a rope of claim 1, wherein the core enters the central bore of the wedge, the central bore transitioning into a voided area of conical shape, the core then brooms outward to fill the conical void, and filling the conical void with a resin (or zinc binder) such that the core terminates in the wedge.

4. A method for terminating a rope, the rope having outer strands surrounding a core, the method comprising:
   sliding a socket over the rope;
   unlaying the outer strands of the rope;
   sliding a wedge onto the core such that the outer strands surround the wedge, the wedge includes a rounded end and central bore axially aligned with the socket, the central bore transitioning into a side bore and an opposite side bore that both lead out of the wedge, further sliding the wedge such that the core enters the central bore and passes and exits through the side bore, wraps around the rounded end enters the opposite bore and terminates in the opposite side bore;
   pressing the outer strands of the rope against the wedge;
   sliding the socket over the wedge such that the outer strands are captured between the wedge and the socket;
   swaging the socket such that the outer strands are secured;
   placing a crush plate on a rounded end of the wedge;
   installing a clevis onto the socket and over the crush plate and the rounded end; and,
   applying force to compress the crush plate and to securely affix the wedge in place.

* * * * *